(12) United States Patent
Tsuchiya et al.

(10) Patent No.: US 11,239,788 B2
(45) Date of Patent: Feb. 1, 2022

(54) MOTOR DRIVING DEVICE, CIRCUITRY FOR CONTROLLING MOTOR DRIVING DEVICE, CONTROL METHOD OF MOTOR DRIVING DEVICE, AND AIR CONDITIONER

(71) Applicant: Mitsubishi Electric Corporation, Tokyo (JP)

(72) Inventors: Atsushi Tsuchiya, Tokyo (JP); Keisuke Uemura, Tokyo (JP); Kazunori Hatakeyama, Tokyo (JP); Yuichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/056,508

(22) PCT Filed: Jun. 14, 2018

(86) PCT No.: PCT/JP2018/022692
§ 371 (c)(1),
(2) Date: Nov. 18, 2020

(87) PCT Pub. No.: WO2019/239539
PCT Pub. Date: Dec. 19, 2019

(65) Prior Publication Data
US 2021/0184618 A1      Jun. 17, 2021

(51) Int. Cl.
*H02P 27/08*      (2006.01)
*H02P 21/22*      (2016.01)
(Continued)

(52) U.S. Cl.
CPC ............ *H02P 29/027* (2013.01); *F24F 11/88* (2018.01); *H02P 27/08* (2013.01); *H02P 2207/05* (2013.01)

(58) Field of Classification Search
CPC ........ H02P 27/06; H02P 27/08; H02P 29/027; H02P 5/74; H02P 21/22; H02P 25/022; F24F 11/88
See application file for complete search history.

(56) References Cited

U.S. PATENT DOCUMENTS 5,694,010 A * 12/1997 Oomura ............... H02H 7/0833
318/400.07
7,791,309 B2 * 9/2010 Hwang ..................... H02P 6/20
318/807
(Continued)

FOREIGN PATENT DOCUMENTS

| JP | S59_99996 A | 6/1984 |
|---|---|---|
| JP | S61_177189 A | 8/1986 |
| JP | H02_36798 A | 2/1990 |

*Primary Examiner* — Thai T Dinh
(74) *Attorney, Agent, or Firm* — Posz Law Group, PLC

(57) ABSTRACT

A motor driving device includes an inverter to supply an alternating current, a switch unit that switches the number of at least one permanent magnet synchronous motor to which the alternating current is supplied from the inverter, a detector to detect a detection value corresponding to the alternating current supplied to the at least one permanent magnet synchronous motor, and a control device to control the inverter and the switch unit. The control device sets an overcurrent interruption threshold value at a value based on the number. When the detection value is greater than or equal to the overcurrent interruption threshold value, the control device makes the inverter stop the supplying of the alternating current to the at least one permanent magnet synchronous motor.

14 Claims, 12 Drawing Sheets

(51) Int. Cl.
    *H02P 29/024*    (2016.01)
    *F24F 11/88*    (2018.01)

(56)  References Cited

U.S. PATENT DOCUMENTS

| | | | | |
|---|---|---|---|---|
| 8,605,461 B2* | 12/2013 | Hibino | ................... | H02P 27/08 |
| | | | | 363/17 |
| 8,618,753 B2* | 12/2013 | Najima | ............. | H02M 7/53871 |
| | | | | 318/139 |
| 9,998,049 B2* | 6/2018 | Kashima | ............. | H02P 21/0021 |

* cited by examiner

WHEN SECOND PM SYNCHRONOUS MOTOR 20b IS DRIVEN --> OPEN SOLENOID VALVE 907

MOTOR DRIVING DEVICE, CIRCUITRY FOR CONTROLLING MOTOR DRIVING DEVICE, CONTROL METHOD OF MOTOR DRIVING DEVICE, AND AIR CONDITIONER

CROSS REFERENCE TO RELATED APPLICATION

This application is a U.S. national stage application of International Patent Application No. PCT/JP2018/022692 filed on Jun. 14, 2018, the disclosure of which is incorporated herein by reference.

TECHNICAL FIELD

The present invention relates to a motor driving device for driving a permanent magnet synchronous motor and to an air conditioner including the motor driving device.

BACKGROUND

Conventionally, in cases where a plurality of motors is driven in parallel by one inverter of a motor driving device, induction motors that can be driven by applying an AC voltage without the need of performing special control are used (see Patent Reference 1, for example). Since loss such as secondary copper loss occurs in induction motors, permanent magnet (PM) synchronous motors free from the secondary copper loss and having high efficiency are widespread in recent years.

PATENT REFERENCE

Patent Reference 1: Japanese Patent Application Publication No. S61-177189 (FIG. 1)

When driving a PM synchronous motor, the inverter of the motor driving device needs to apply voltage corresponding to a magnetic pole position of a permanent magnet of a rotor to a stator winding. Therefore, when one inverter applies an AC voltage to a plurality of PM synchronous motors, there are cases where it is impossible to operate the rotors of the plurality of PM synchronous motors at the same operating point due to variations in properties of the PM synchronous motors or the like. In such cases, there is a danger that variations occur to operating current values of the plurality of PM synchronous motors, a step-out occurs to a PM synchronous motor whose operating point is greatly deviated, and an excessive current flows into the stator winding of the PM synchronous motor.

In a PM synchronous motor, when an excessive current (i.e., a current having a value higher than or equal to an irreversible demagnetization current value intrinsic to the PM synchronous motor) flows into the stator winding, irreversible demagnetization occurs to the permanent magnet and that leads to a drop in output torque and a drop in efficiency. Therefore, a motor driving device for driving a PM synchronous motor has an overcurrent protection function of stopping the supply of current by the inverter so as to prevent the inflow of a current having a value higher than or equal to a protective current level into the PM synchronous motor.

However, if the motor driving device is provided with a function of switching the number of driven PM synchronous motors and the step-out or failure occurs when a plurality of PM synchronous motors are driven in parallel, there is a danger that a current having a value higher than or equal to the irreversible demagnetization current value flows into a PM synchronous motor and the irreversible demagnetization occurs to a permanent magnet.

An object of the present invention, which has been made to resolve the above-described problem with the conventional technology, is to provide a motor driving device capable of switching the number of driven permanent magnet synchronous motors and preventing the irreversible demagnetization from occurring in a permanent magnet synchronous motor, and an air conditioner including the motor driving device.

SUMMARY

A motor driving device according to an aspect of the present invention is a device that drives at least one permanent magnet synchronous motor, including an inverter to supply an alternating current, a switch unit that switches a number of the at least one permanent magnet synchronous motor to which the alternating current is supplied from the inverter, a detector to detect a detection value corresponding to the alternating current supplied to the at least one permanent magnet synchronous motor, and a control device to control the inverter and the switch unit. The control device sets an overcurrent interruption threshold value at a value based on the number. When the detection value is greater than or equal to the overcurrent interruption threshold value, the control device makes the inverter stop the supply of the alternating current to the at least one permanent magnet synchronous motor.

An air conditioner according to another aspect of the present invention is an air conditioner including a plurality of permanent magnet synchronous motors and a motor driving device that drives at least one permanent magnet synchronous motor among the plurality of permanent magnet synchronous motors. The motor driving device includes an inverter to supply an alternating current, a switch unit that switches a number of the at least one permanent magnet synchronous motor to which the alternating current is supplied from the inverter, a detector to detect a detection value corresponding to the alternating current supplied to the at least one permanent magnet synchronous motor, and a control device to control the inverter and the switch unit. The control device sets an overcurrent interruption threshold value at a value based on the number. When the detection value is greater than or equal to the overcurrent interruption threshold value, the control device makes the inverter stop the supply of the alternating current to the at least one permanent magnet synchronous motor.

According to the present invention, it is possible to switch the number of driven permanent magnet synchronous motors and prevent the irreversible demagnetization from occurring in a permanent magnet synchronous motor.

DETAILED DESCRIPTION

A motor driving device and an air conditioner including the motor driving device according to each embodiment of the present invention will be described below with reference to the accompanying drawings. The motor driving device according to each embodiment is a device that drives one or more permanent magnet (PM) synchronous motors. Configurations of embodiments can be combined with each other. The following embodiments are just examples and a variety of modifications are possible within the scope of the present invention.

(1) First Embodiment (1-1) Configuration

Figure 1:
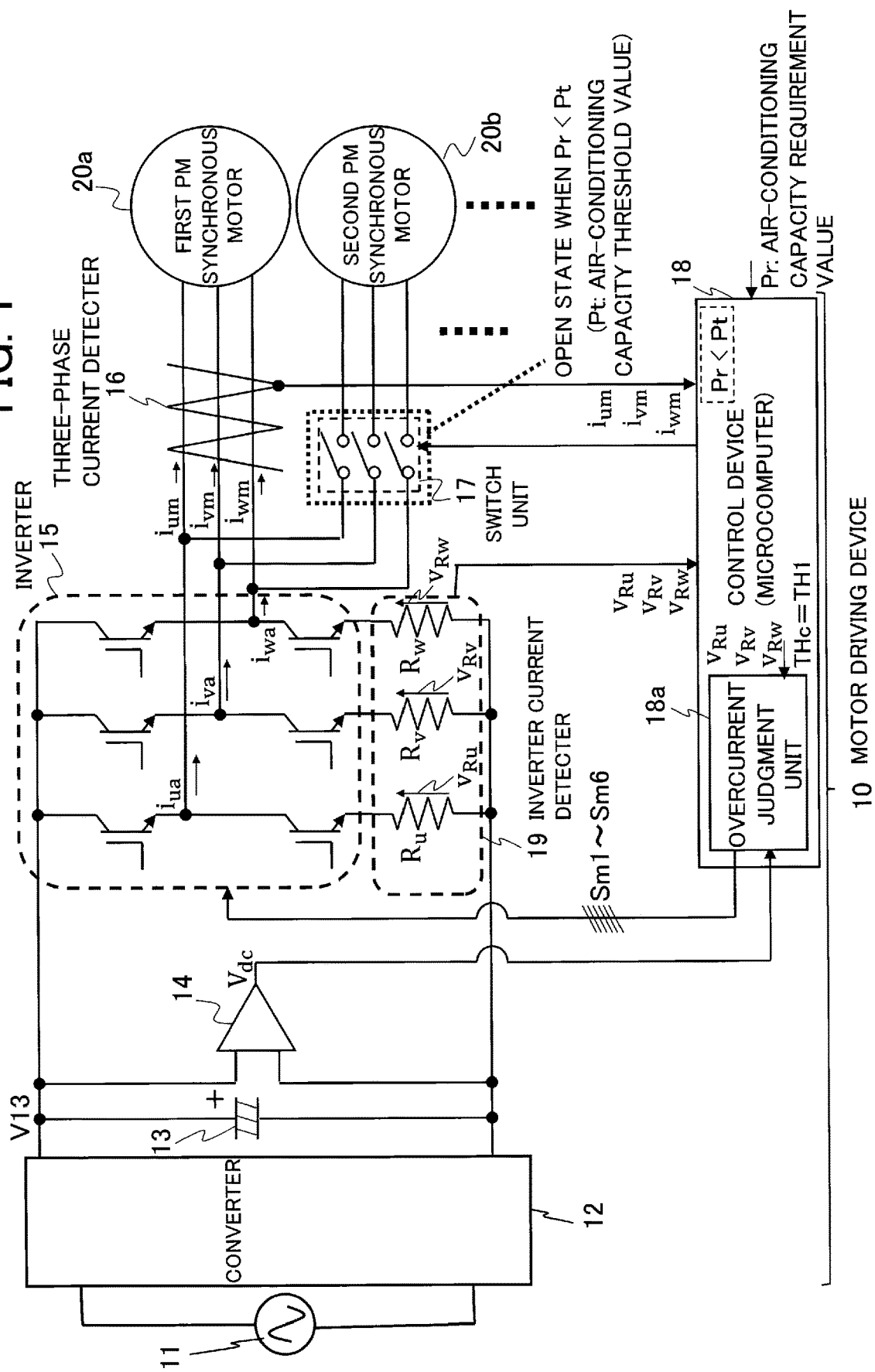
FIG. 1 is a diagram schematically showing a configuration of a motor driving device according to a first embodiment of the present invention (when driving one PM synchronous motor).
Figure 2:
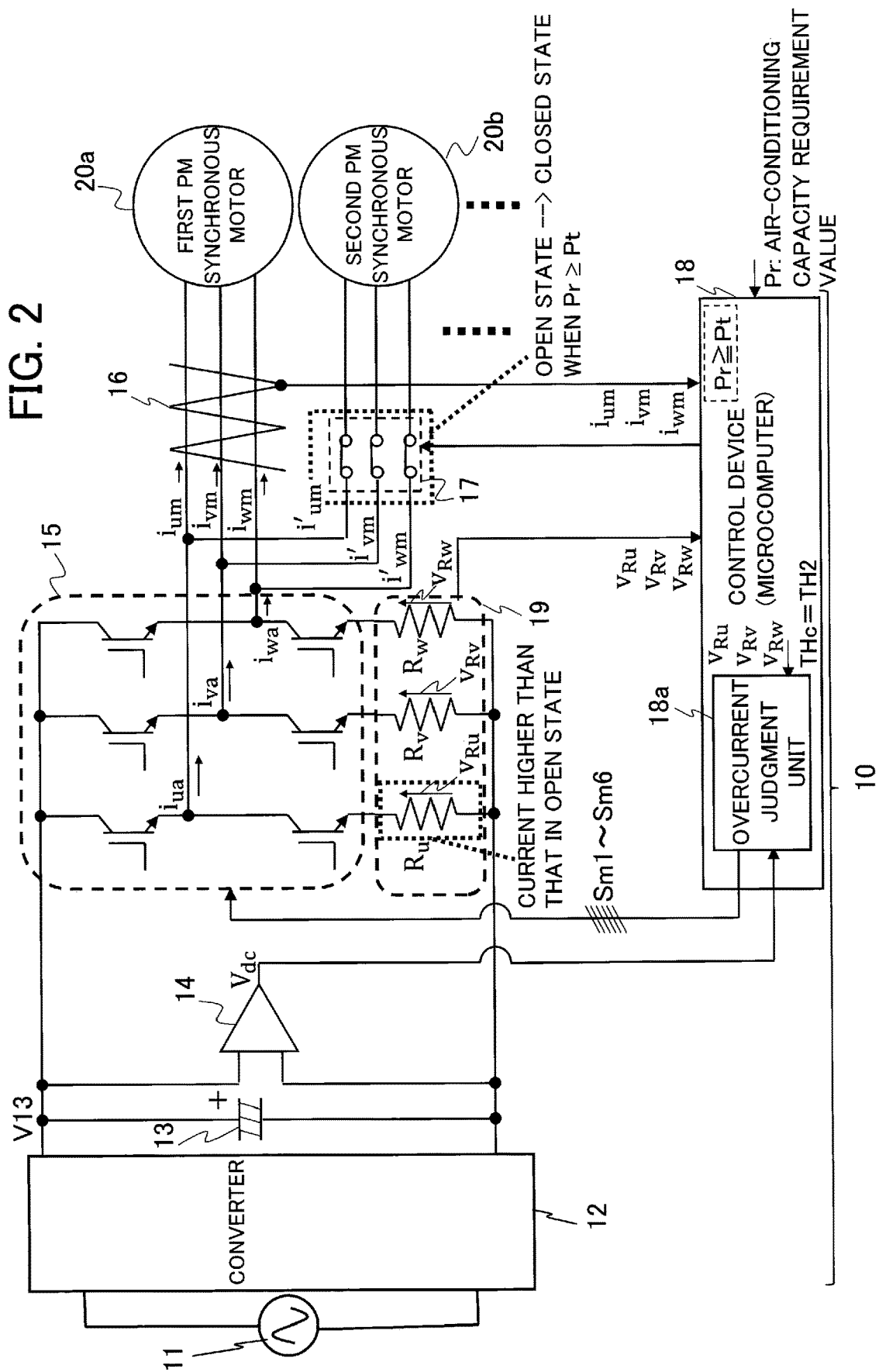
FIG. 2 is a diagram schematically showing the configuration of the motor driving device according to the first embodiment (when driving two PM synchronous motors).

FIG. 1 is a diagram schematically showing a configuration of a motor driving device 10 according to a first embodiment (when driving one PM synchronous motor 20a). FIG. 2 is a diagram schematically showing the configuration of the motor driving device 10 according to the first embodiment (when driving two PM synchronous motors 20a and 20b).

As shown in FIG. 1 and FIG. 2, the motor driving device 10 is capable of selecting either an operation mode for driving one PM synchronous motor 20a (FIG. 1) or an operation mode for driving two PM synchronous motors 20a and 20b in parallel (FIG. 2) by switching a connection state of a switch unit 17. The motor driving device 10 may also be configured to have an operation mode for driving three or more PM synchronous motors in parallel. The following description will be given of cases where the number of driven PM synchronous motors is less than or equal to two. The PM synchronous motor 20a will be referred to also as a "first PM synchronous motor 20a" and the PM synchronous motor 20b will be referred to also as a "second PM synchronous motor 20b".

Figure 3:
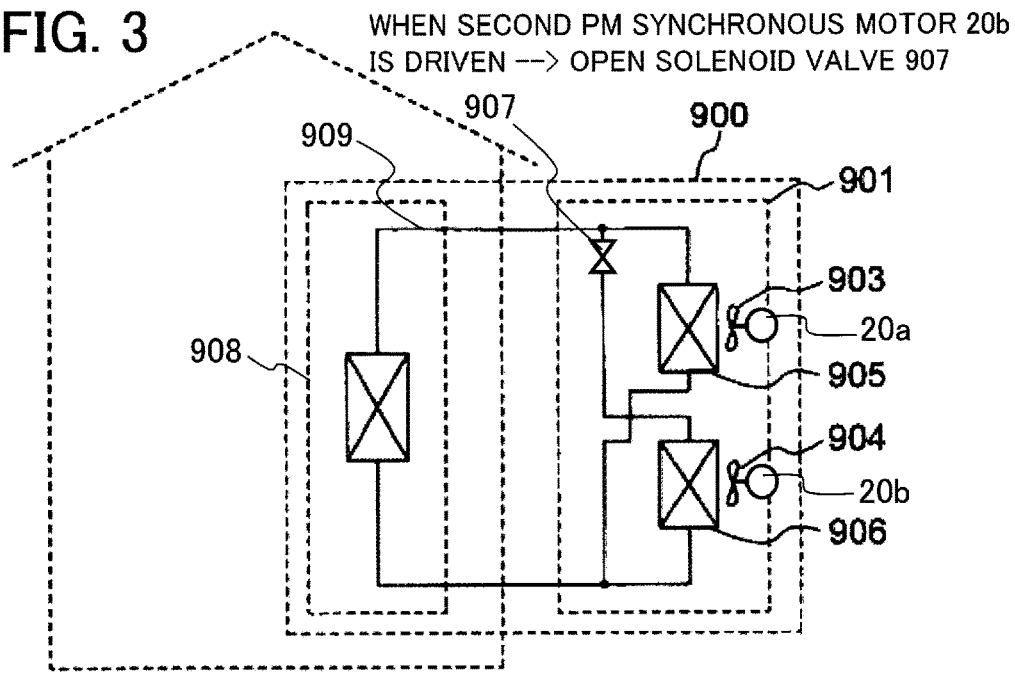
FIG. 3 is a schematic diagram showing a configuration of an air conditioner including fans driven by PM synchronous motors in FIG. 1.

FIG. 3 is a schematic diagram showing a configuration of an air conditioner 900 including first and second fans 903 and 904 respectively connected to the first and second PM synchronous motors 20a and 20b shown in FIG. 1 and FIG. 2. As shown in FIG. 3, the air conditioner 900 includes an outdoor unit 901, an indoor unit 908, and refrigerant piping 909 connecting the outdoor unit 901 and the indoor unit 908 together. As the refrigerant piping 909, a certain number of refrigerant piping systems corresponding to the number of PM synchronous motors installed in the outdoor unit 901 are provided. Various types of members constituting a refrigerant circuit such as valves and pumps arranged in the middle of the refrigerant piping 909 are not shown in the drawing since such members are publicly known.

The first and second PM synchronous motors 20a and 20b are motors for respectively driving the first and second fans 903 and 904 of the outdoor unit 901 of the air conditioner 900, for example. The first and second fans 903 and 904 are provided for first and second heat exchangers 905 and 906 and blow air towards the first and second heat exchangers 905 and 906, for example. When only the first PM synchronous motor 20a operates, a solenoid valve 907 is in a closed state and the refrigerant flows into the first heat exchanger 905. When the first and second PM synchronous motors 20a and 20b operate in parallel, the solenoid valve 907 is in an open state and the refrigerant flows into both of the first and second heat exchangers 905 and 906. By the parallel operation of the first and second PM synchronous motors 20a and 20b, air-conditioning capacity (e.g., cooling capacity or heating capacity) of the air conditioner 900 increases.

As shown in FIG. 1 and FIG. 2, the motor driving device 10 includes a converter 12 that converts an alternating current (AC) voltage inputted from an AC power supply 11 into a direct current (DC) voltage, a capacitor 13, a voltage detector 14, and an inverter 15 to supply an alternating current (AC current). Further, the motor driving device 10 includes a motor current detector 16, the switch unit 17 that switches a driven motor number as the number of PM synchronous motors to which the AC current is supplied, a control device 18 that controls the inverter 15 and the switch unit 17, and an inverter current detector (also referred to simply as a "detector") 19 including shunt resistors of resistance values $R_u$, $R_v$, and $R_w$ for detecting detection values $v_{Ru}$, $v_{Rv}$ and $v_{Rw}$ corresponding to the supplied AC currents $i_{ua}$, $i_{va}$ and $i_{wa}$. The positions and the number of the shunt resistors are not limited to the illustrated example. The shunt resistors may be arranged at other positions as long as values corresponding to the AC currents outputted by the inverter 15 can be detected, or the shunt resistors may also be implemented by one resistor.

The motor current detector 16 feeds back magnitude of each current $i_{um}$, $i_{vm}$, $i_{wm}$ flowing into the first PM synchronous motor 20a to the control device 18. The inverter current detector 19 is placed on a GND (ground) side of the inverter 15, for example, and detects current values of the current flowing into the inverter 15. The inverter current detector 19 feeds back magnitude of the AC current outputted from the inverter 15 to the control device 18. The control device 18 sets an overcurrent interruption threshold value THc based on the driven motor number and makes the inverter 15 stop the supply of the currents $i_{ua}$, $i_{va}$ and $i_{wa}$ to the PM synchronous motors when a detection value (e.g., $v_{Ru}$, $v_{Rv}$, $v_{Rw}$) is greater than or equal to the overcurrent interruption threshold value THc.

The control device 18 may be formed with, for example, a microcomputer including a CPU (Central Processing Unit) for executing a program as software stored in a storage unit such as a memory, a DSP (Digital Signal Processor), or the like, or dedicated hardware including a semiconductor integrated circuit or the like. The control device 18 may also be a combination of a microcomputer for executing a program and dedicated hardware. The following description will be given of cases where the control device 18 is a microcomputer.

Input terminals of the converter 12 are connected to the AC power supply 11 situated outside, and an AC voltage is applied from the AC power supply 11 to the input terminals. The converter 12, including a rectification circuit, generates a DC voltage by rectifying the AC voltage inputted from the AC power supply 11. The rectification circuit is, for example, a full-wave rectification circuit formed by bridge connection of rectification elements such as diodes. The capacitor 13 smooths the DC voltage generated by the converter 12 and outputs a DC voltage V13.

Figure 4:
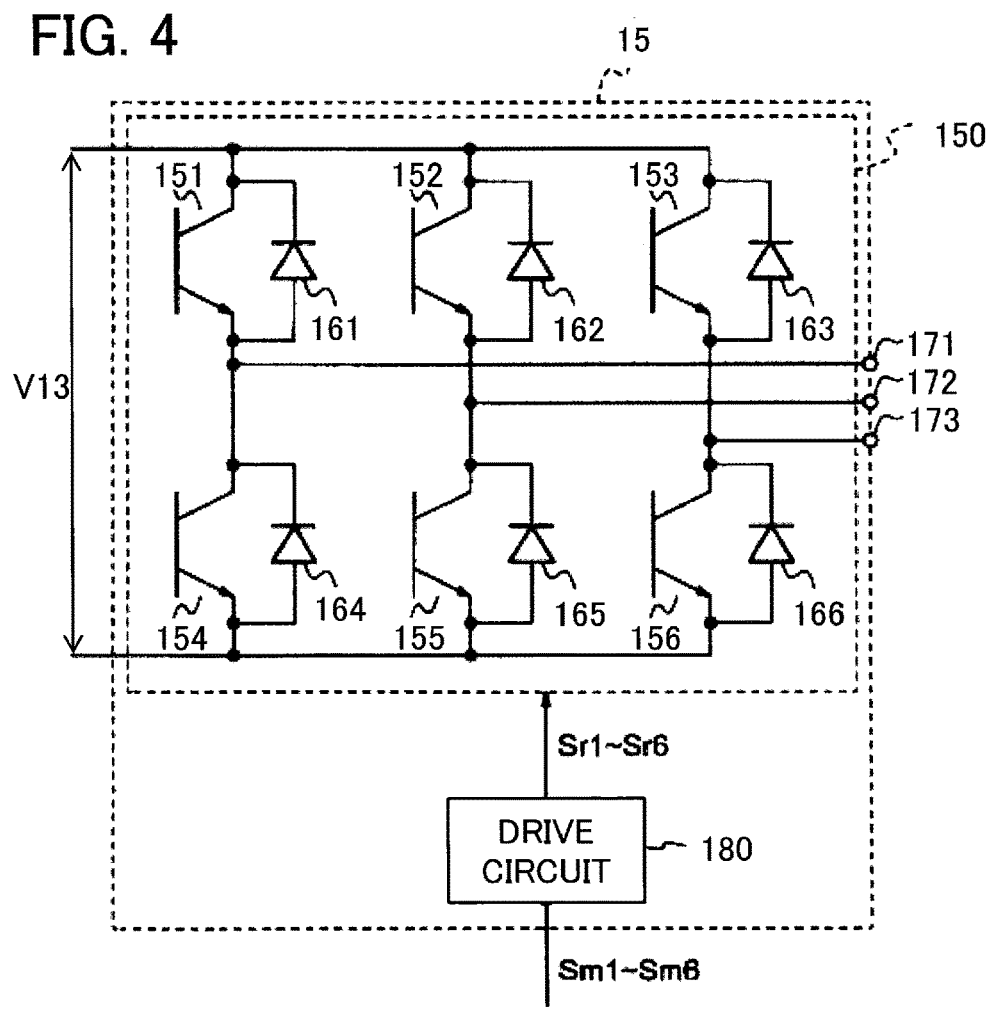
FIG. 4 is a diagram showing a configuration of an inverter in FIG. 1.

FIG. 4 is a diagram showing a configuration of the inverter 15 in FIG. 1. As shown in FIG. 4, the inverter 15 includes an inverter main circuit 150 and a drive circuit 180. Input terminals of the inverter main circuit 150 are connected to electrodes of the capacitor 130. Lines connecting output terminals of the converter 12, the electrodes of the capacitor 13 and the input terminals of the inverter main circuit 150 will be referred to as DC buses.

The inverter 15 is controlled by the control device 18, and switching elements 151 to 156 of six arms of the inverter main circuit 150 perform on-off operation, generate a frequency variable and voltage variable three-phase AC current, and supply the three-phase AC current to the PM synchronous motors 20a and 20b. Rectification elements 161 to 166 for reflux are respectively connected in parallel with the switching elements 151 to 156.

When the switch unit 17 is in a closed state, the PM synchronous motors 20a and 20b are driven in parallel by the inverter 15 and are parallelly connected to inverter output terminals 171, 172 and 173.

The motor current detector 16 detects the currents $i_{um}$, $i_{vm}$ and $i_{wm}$ flowing through lines connecting the inverter output terminals 171, 172 and 173 and the first PM synchronous motor 20a. Incidentally, the motor driving device 10 may also be configured to include another motor current detector (not shown) that detects currents $i'_{um}$, $i'_{vm}$ and $i'_{wm}$ flowing through lines connecting the inverter output terminals 171, 172 and 173 and the second PM synchronous motor 20b and outputs the detection values to the control device 18. The currents $i_{um}$, $i_{vm}$ and $i_{wm}$ detected by the motor current detector 16 are converted into a digital signal by a non-illustrated A/D (Analog to Digital) conversion unit in the control device 18 and used for processing in the control device 18.

The voltage detector 14 detects the DC voltage inputted to the inverter 15, that is, the DC voltage V13 between terminals of the capacitor 13. The voltage $V_{dc}$ detected by the voltage detector 14 is converted into a digital signal by a non-illustrated A/D conversion unit in the control device 18 and used for processing in the control device 18.

The control device 18 controls magnitude and frequency of output voltages of the inverter 15 based on the motor currents (hereinafter referred to also as "phase currents") $i_{um}$, $i_{vm}$ and $i_{wm}$ as the detected three-phase current and the input voltage $V_{dc}$ of the inverter 15 detected by the voltage detector 14. For the control of the inverter 15, the control device 18 generates PWM (Pulse Width Modulation) signals Sm1 to Sm6 and supplies the PWM signals Sm1 to Sm6 to the inverter 15.

The inverter 15 includes the drive circuit 180 in addition to the inverter main circuit 150 as mentioned above, and the drive circuit 180 generates drive signals Sr1 to Sr6 based on the PWM signals Sm1 to Sm6. The inverter 15 controls the on-off switching of the switching elements 151 to 156 by using the drive signals Sr1 to Sr6, by which frequency variable and voltage variable three-phase AC voltage is applied to the PM synchronous motors 20a and 20b.

The PWM signals Sm1 to Sm6 are signals at magnitude (0 to 5 [V]) of a signal level of a logic circuit, whereas the drive signals Sr1 to Sr6 are signals at voltage levels necessary for controlling the switching elements 151 to 156, e.g., +15 [V] to −15 [V]. Further, the PWM signals Sm1 to Sm6 are signals with reference to ground potential of the control device 18 as reference potential, whereas the drive signals Sr1 to Sr6 are signals respectively with reference to potential of a negative-side terminal (emitter terminal) of the corresponding switching element as the reference potential.

The control device 18 performs a startup process at the startup of the PM synchronous motors in addition to performing control at times of normal rotation (at times of rotation after the startup) of the PM synchronous motors. In the startup process, the control device 18 performs an operation of bringing the rotors of the first and second PM synchronous motors 20a and 20b to designated positions by carrying out DC energization of feeding a DC current to the stator windings of the first and second PM synchronous motors 20a and 20b. Details of a configuration example of the control device 18 will be described later.

(1-2) Operation

The control device 18 switches the connection state of the switch unit 17 to an open state or the closed state depending on an air-conditioning capacity requirement value Pr representing the air-conditioning capacity required of the air conditioner 900 (FIG. 3) driven by the inverter 15 and the first PM synchronous motor 20a (or the inverter 15 and the first and second PM synchronous motors 20a and 20b). The air-conditioning capacity requirement value Pr is a value based on various conditions such as a set temperature that has been specified on the air conditioner 900, an indoor temperature in the room where the indoor unit 908 is installed and an outdoor temperature at the place where the outdoor unit 901 is installed. While the air-conditioning capacity requirement value Pr can be represented by a continuously changing numerical value (e.g., in units of [W]), the air-conditioning capacity requirement value Pr can also be represented by a discretely changing numerical value (e.g., the number of PM synchronous motors that need to be driven).

When the air-conditioning capacity requirement value Pr is less than an air-conditioning capacity threshold value Pt representing the upper limit of the present air-conditioning capacity, the control device 18 maintains the number of driven PM synchronous motors unchanged by maintaining the connection state of the switch unit 17 in the open state. When the air-conditioning capacity requirement value Pr is greater than or equal to the air-conditioning capacity threshold value Pt, the control device 18 increases the number of driven PM synchronous motors by changing the connection state of the switch unit 17 to the closed state. Namely, the control device 18 sets the connection state of the switch unit 17 in the open state (FIG. 1) when Pr<Pt holds, and sets the connection state of the switch unit 17 in the closed state (FIG. 2) when Pr≥Pt holds. In the example of FIG. 1, the air-conditioning capacity threshold value Pt is, for example, the upper limit value of the air-conditioning capacity of the air conditioner when only one PM synchronous motor 20a is used.

Figure 5:
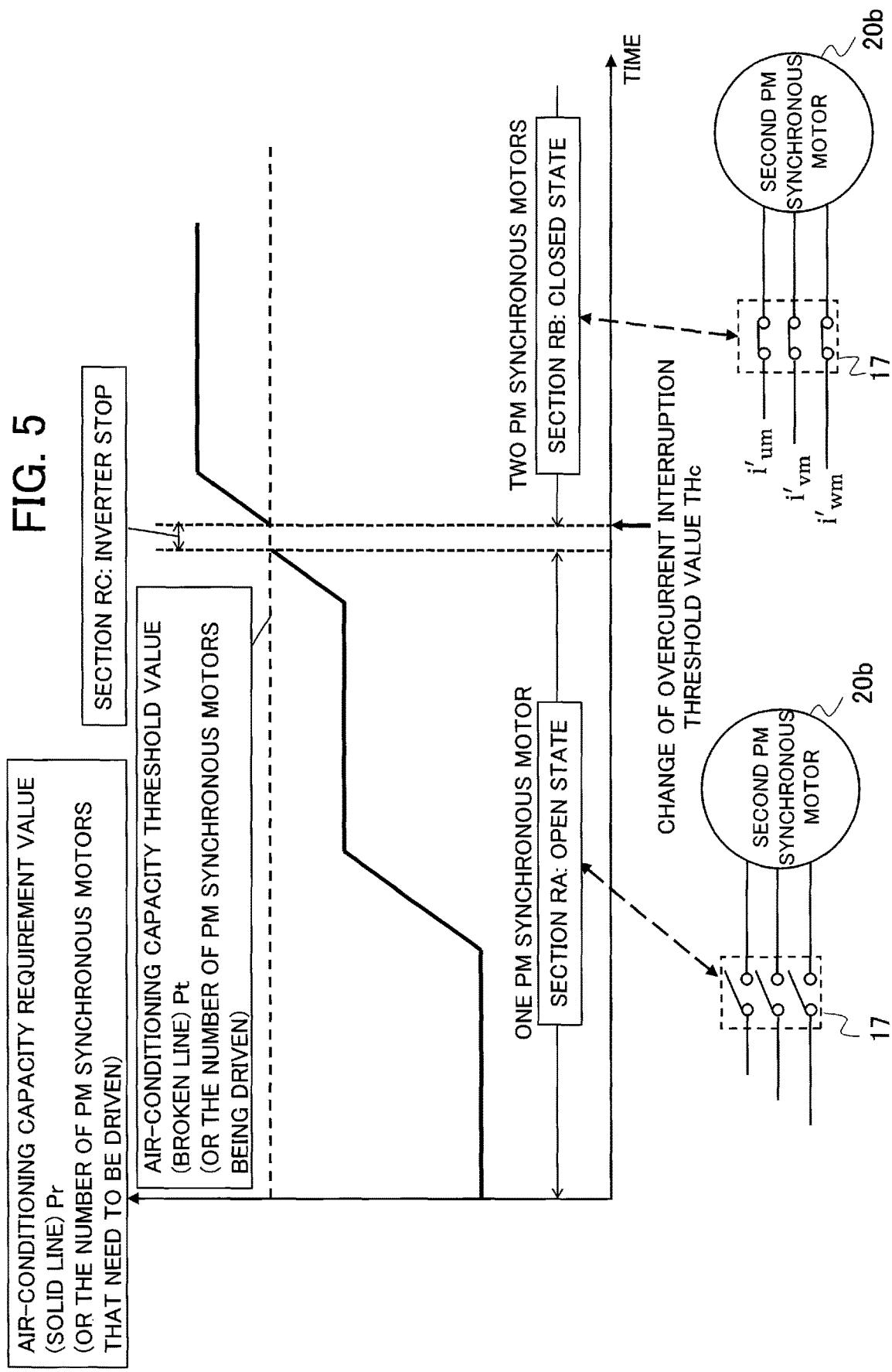
FIG. 5 is a diagram showing an example of an overcurrent interruption threshold value setting operation.

FIG. 5 is a diagram showing an operation for changing the overcurrent interruption threshold value THc. In FIG. 5, the air-conditioning capacity requirement value Pr is indicated by solid lines and the air-conditioning capacity threshold value Pt is indicated by a broken line. First, the air-conditioning capacity requirement value Pr in a section RA is less than the air-conditioning capacity threshold value Pt. Therefore, the control device 18 maintains the connection state of the switch unit 17 in the open state even when the air-conditioning capacity requirement value Pr changes within the range below the air-conditioning capacity threshold value Pt.

The air-conditioning capacity requirement value Pr in a section RB is greater than or equal to the air-conditioning capacity threshold value Pt. Therefore, the control device 18 maintains the connection state of the switch unit 17 in the closed state even when the air-conditioning capacity requirement value Pr changes within the range higher than or equal to the air-conditioning capacity threshold value Pt.

In a section RC between the section RA and the section RB, the control device 18 makes the inverter 15 temporarily stop the supply of the AC current. In the section RC, the control device 18 switches the connection state of the switch unit 17 from the open state to the closed state and makes it possible to execute the air-conditioning operation at intensity satisfying the air-conditioning capacity requirement value Pr by driving the first and second PM synchronous motors 20a and 20b while maintaining synchronization of the first and second PM synchronous motors 20a and 20b. Also when the connection state of the switch unit 17 is switched from the closed state to the open state, the supply of the AC current from the inverter 15 is stopped.

In the first embodiment, the values of the motor currents detected by the motor current detector 16 in the section RA and the values of the motor currents detected by the motor current detector 16 in the section RB greatly differ from each other, and thus methods different from each other have to be used in the sections RA and RB as a control method for preventing the inflow of a current having a value higher than or equal to the irreversible demagnetization current value Id into the first and second PM synchronous motors 20a and 20b. Therefore, in the motor driving device 10 according to the first embodiment, the overcurrent interruption threshold value THc is changed according to the air-conditioning capacity requirement value Pr so that the current value of the current flowing into the PM synchronous motors does not exceed the irreversible demagnetization current value Id.

In other words, when the irreversible demagnetization current value Id of a plurality of PM synchronous motors connected is smaller than the value of the current that can be supplied by the inverter 15, there is a danger of occurrence of a situation where a current having a value higher than or equal to the irreversible demagnetization current value Id flows into the PM synchronous motors depending on the phases and driving conditions of the plurality of PM synchronous motors. The motor driving device 10 according to the first embodiment is capable of avoiding the occurrence of the situation where a current having a value higher than or equal to the irreversible demagnetization current value Id flows depending on the phases and the driving conditions of the plurality of PM synchronous motors even when the irreversible demagnetization current value Id of the plurality of PM synchronous motors connected is smaller than the current value of the current that can be supplied by the inverter 15.

Figure 6:
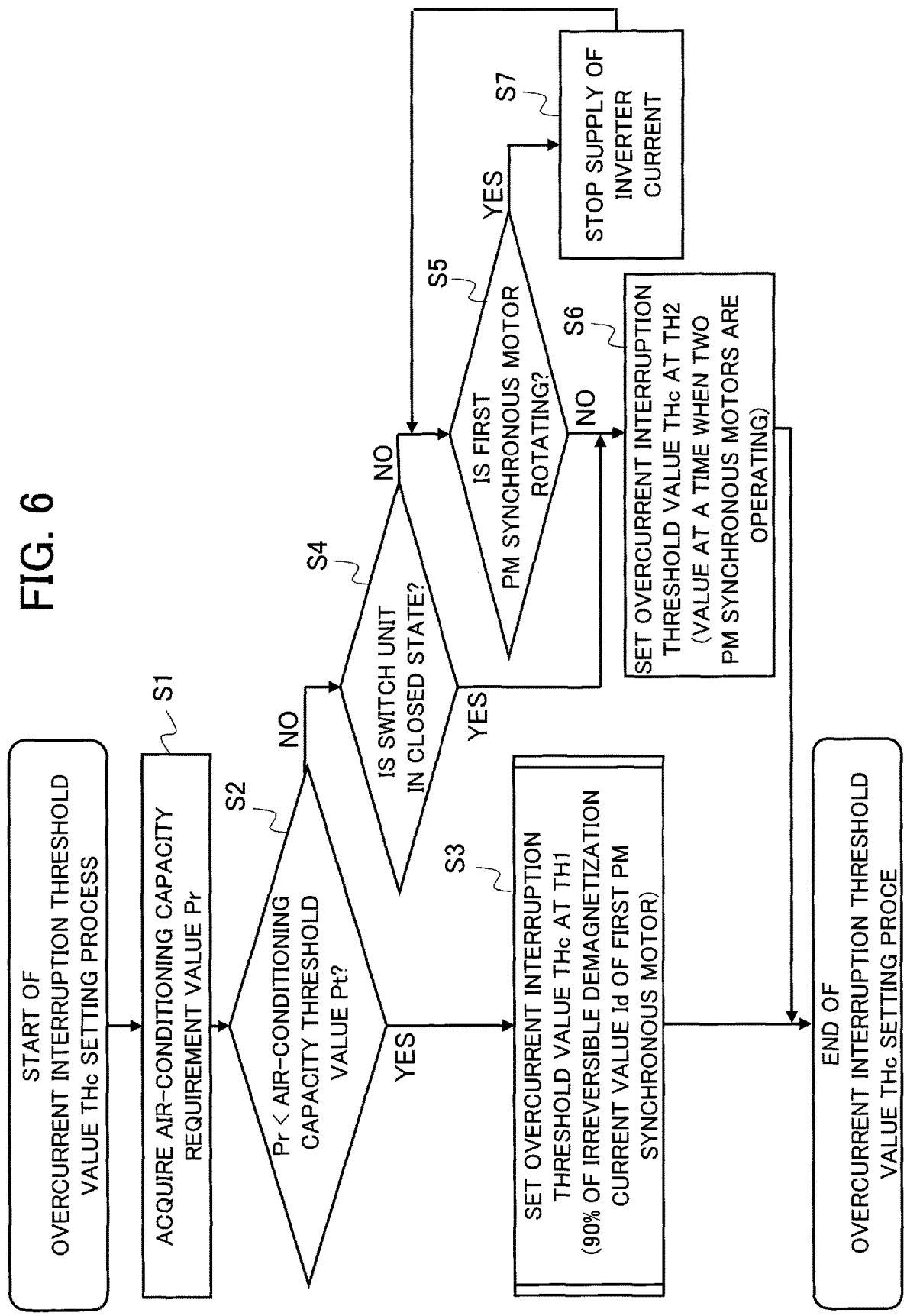
FIG. 6 is a flowchart showing an overcurrent interruption threshold value setting process.

FIG. 6 is a flowchart showing a process for setting the overcurrent interruption threshold value THc. In the example of FIG. 6, the overcurrent interruption threshold value THc is determined based on the air-conditioning capacity requirement value Pr and the air-conditioning capacity threshold value Pt. First, in step S1, the control device 18 acquires the air-conditioning capacity requirement value Pr. The air-conditioning capacity requirement value Pr is, for example, a value inputted by a user using the air conditioner or a value determined by the control device 18 based on a temperature setting signal or the like inputted by the user. The air-conditioning capacity requirement value Pr can also be information representing the number of driven PM synchronous motors, for example. In the next step S2, the control device 18 judges whether or not the air-conditioning capacity requirement value Pr is smaller than the air-conditioning capacity threshold value Pt.

When the air-conditioning capacity requirement value Pr is smaller than the air-conditioning capacity threshold value Pt (YES in the step S2), the air-conditioning capacity represented by the air-conditioning capacity requirement value Pr can be implemented by the operation of the first PM synchronous motor 20a alone, and thus the control device 18 in step S3 maintains the connection state of the switch unit 17 in the open state and sets the overcurrent interruption threshold value THc at a first overcurrent interruption threshold value TH1 as a value at times when one PM synchronous motor is operating. When the overcurrent interruption threshold value THc is set at the first overcurrent interruption threshold value TH1, the protective current level (first protective current level) as the upper limit value of the AC current supplied from the inverter 15 is, for example, a value obtained by multiplying the irreversible demagnetization current value Id of the first PM synchronous motor 20a by a predetermined first ratio (e.g., numerical value less than 1). The predetermined first ratio is, for example, a ratio of 0.9, that is, 90%. This makes it possible to carry out the operation of one PM synchronous motor so as to prevent the inflow of a current having a value higher than or equal to the irreversible demagnetization current value Id into the first PM synchronous motor 20a.

When the air-conditioning capacity requirement value Pr is greater than or equal to the air-conditioning capacity threshold value Pt (NO in the step S2), the control device 18 in step S4 judges whether the connection state of the switch unit 17 is the open state (FIG. 1) or the closed state (FIG. 2). When the connection state of the switch unit 17 is the closed state (YES in the step S4), the control device 18 in step S6 judges that the first and second PM synchronous motors 20a and 20b are operating and sets the overcurrent interruption threshold value THc at a second overcurrent interruption threshold value TH2 as a value at times when two PM synchronous motors are operating.

When the connection state of the switch unit 17 is the open state (NO in the step S4), the control device 18 in step S5 judges whether or not the first PM synchronous motor 20a is operating (i.e., rotating). If the first PM synchronous motor 20a is rotating (YES in the step S5), the control device 18 in step S7 stops the supply of the current, returns the process to the step S5, and thereafter advances the process to the step S6. In the step S6, the control device 18 judges that the first and second PM synchronous motors 20a and 20b are operating and sets the overcurrent interruption threshold value THc at the second overcurrent interruption threshold value TH2 as the value at times when two PM synchronous motors are operating.

Figure 7:
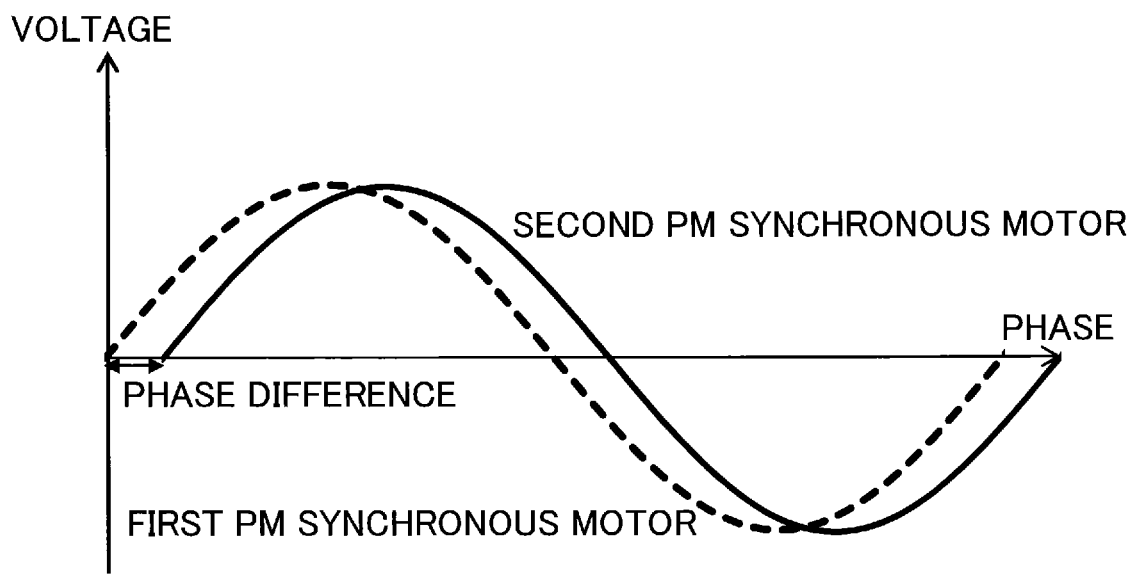
FIG. 7 is a diagram showing a phase difference between phase currents flowing into stator windings of two PM synchronous motors when the two PM synchronous motors are driven in parallel by the motor driving device according to the first embodiment.

FIG. 7 is a diagram showing a phase difference between phase currents when two PM synchronous motors are driven by the motor driving device 10 according to the first embodiment. As shown in FIG. 7, the second PM synchronous motor 20b (whose phase current is indicated by a solid line) operates to follow the control of the first PM synchronous motor 20a (whose phase current is indicated by a broken line). Thus, the current of the first PM synchronous motor 20a and the current of the second PM synchronous motor 20b have the phase difference as shown in FIG. 7 and the step-out occurs when the phase difference reaches a certain value or higher. It is ideal if a current value ratio between the phase currents of the first PM synchronous motor 20a and the second PM synchronous motor 20b is 1:1. However, due to variations in the properties of the first PM synchronous motor 20a and the second PM synchronous motor 20b, a temperature environment difference between installation positions of the first PM synchronous motor 20a and the second PM synchronous motor 20b, and so forth, it is presumed that the phase difference increases and the current value ratio between the phase currents of the first PM synchronous motor 20a and the second PM synchronous motor 20b cannot maintain the 1:1 relationship.

Figure 8:
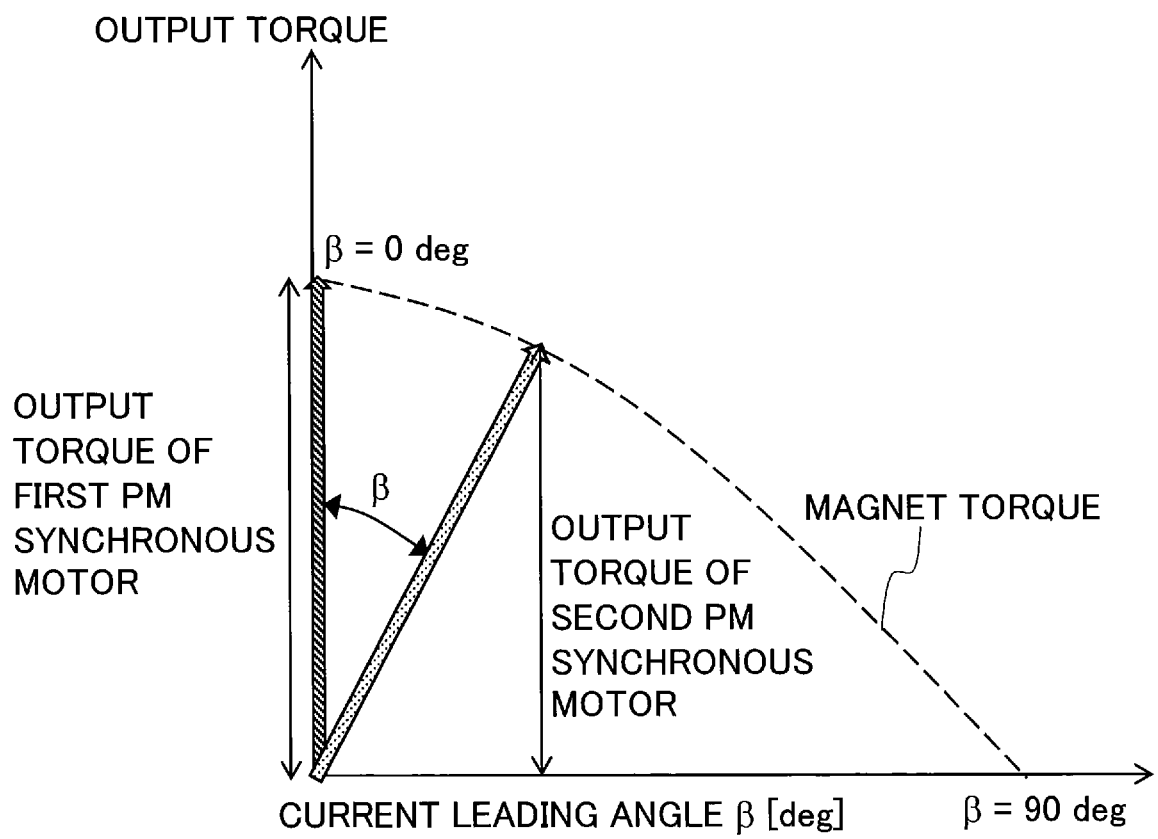
FIG. 8 is a diagram showing a relationship between output torque and a leading angle of the phase currents flowing into the stator windings of two PM synchronous motors when the two PM synchronous motors are driven by the motor driving device according to the first embodiment.

FIG. 8 is a diagram showing output torque and a current leading angle β [deg.] of PM synchronous motors when the motor driving device according to the first embodiment drives two PM synchronous motors. When there is a phase difference between the phase currents of the two PM synchronous motors and the first PM synchronous motor 20a outputs its maximum torque (β=0 degrees), magnet torque of the second PM synchronous motor 20b is indicated by using β>0 degrees as can be understood from FIG. 8. As is clear from FIG. 8, the output torque of the second PM synchronous motor 20b is low compared to that of the first PM synchronous motor 20a, and thus higher current flows into the second PM synchronous motor 20b than into the first PM synchronous motor 20a. Here, it is assumed that the upper limit of an allowable maximum phase difference is 45 degrees. When there is the 45-degree phase difference, the ratio between the output torque of the first PM synchronous motor 20a and the output torque of the second PM synchronous motor 20b is 1:(1/$\sqrt{2}$). Thus, in order to obtain the same output torque, the phase current of the second PM synchronous motor 20b has to be set at $\sqrt{2}$ (i.e., approximately 1.414 times) the phase current of the first PM synchronous motor 20a.

On the assumption that the ratio between the current values of the first PM synchronous motor 20a and the second PM synchronous motor 20b reaches 1:$\sqrt{2}$, when a current value capable of driving the maximum load in an ideal condition is 10 [A], a current value of the first PM synchronous motor 20a capable of driving the maximum load is 10 [A] and a current value of the second PM synchronous motor 20b capable of driving the maximum load is 10 [A]× $\sqrt{2}$=14.14 [A]. Namely, by determining the overcurrent interruption threshold value THc, which is used for a judgment by an overcurrent judgment unit 18a, so as to set a protective current level (second protective current level) of the AC current supplied from the inverter 15 at 10 [A]+10 [A]×$\sqrt{2}$=24.14 [A], it becomes possible to continue the operation in a maximum load condition even when a phase difference occurs.

Incidentally, since each PM synchronous motor has manufacturing variations and temperature variations, the overcurrent interruption threshold value THc may be adjusted in consideration of these variations.

Further, the setting of the overcurrent interruption threshold value THc has to be made so that the protective current level does not exceed 2×Id [A] that is the sum total of the irreversible demagnetization current values Id of the two PM synchronous motors (i.e., the first and second PM synchronous motors 20a and 20b). For example, when Id=20 [A], the protective current level as the upper limit value of the current supplied from the inverter 15 to the two PM synchronous motors is lower than or equal to 2×Id [A]=40 [A].

Here, a discussion will be given below on a case where one PM synchronous motor steps out when the first PM synchronous motor 20a is driven by the phase current of 1 [A] and the second PM synchronous motor 20b is driven by the phase current of 1 [A], the phase current reaches 24.14 [A] as the protective current level, and the operation of the inverter 15 is stopped. In this case, a current up to 23.14 [A] (=24.14 [A]−1 [A]) can flow into one PM synchronous motor in operation. Namely, there is a danger that a current exceeding 20 [A] as the irreversible demagnetization current value Id of the PM synchronous motor flows into the PM synchronous motor. Therefore, it is desirable to provide a means for individually detecting the current value of each PM synchronous motor and make the control device 18 prevent the irreversible demagnetization by stopping the supply of the current by the inverter 15 before the phase current flowing into each PM synchronous motor exceeds the irreversible demagnetization current value Id.

(1-3) Effect

As described above, with the motor driving device 10 and the air conditioner according to the first embodiment, in the air conditioner in which a plurality of PM synchronous motors are driven by one inverter 15, it is possible to switch the number of PM synchronous motors driven by the inverter 15 and prevent the occurrence of the irreversible demagnetization to the PM synchronous motors by changing the overcurrent interruption threshold value THc depending on the air-conditioning capacity requirement value Pr.

Further, with the motor driving device 10 and the air conditioner according to the first embodiment, the motor driving device 10 can be simplified in configuration, reduced in price, and downsized compared to cases where the motor driving device includes a plurality of inverters 15.

In cases where the product of the irreversible demagnetization current value Id per PM synchronous motor and the number of operating PM synchronous motors is greater than current-carrying capacity of the inverter 15, it is possible to set the protective current level at the current-carrying capacity of the inverter 15. In this case, it becomes possible to protect the inverter 15 and obtain a motor driving device for PM synchronous motors with higher reliability.

Furthermore, by setting the protective current level not at a value proportional to the number of PM synchronous motors but in consideration of a current increment that can be caused by variations in the operating point occurring between the plurality of PM synchronous motors in regard to the maximum current presumable during the operation, it becomes possible to reliably inhibit the irreversible demagnetization of the PM synchronous motors and continue the operation at times of overload.

(2) Second Embodiment

Figure 9:
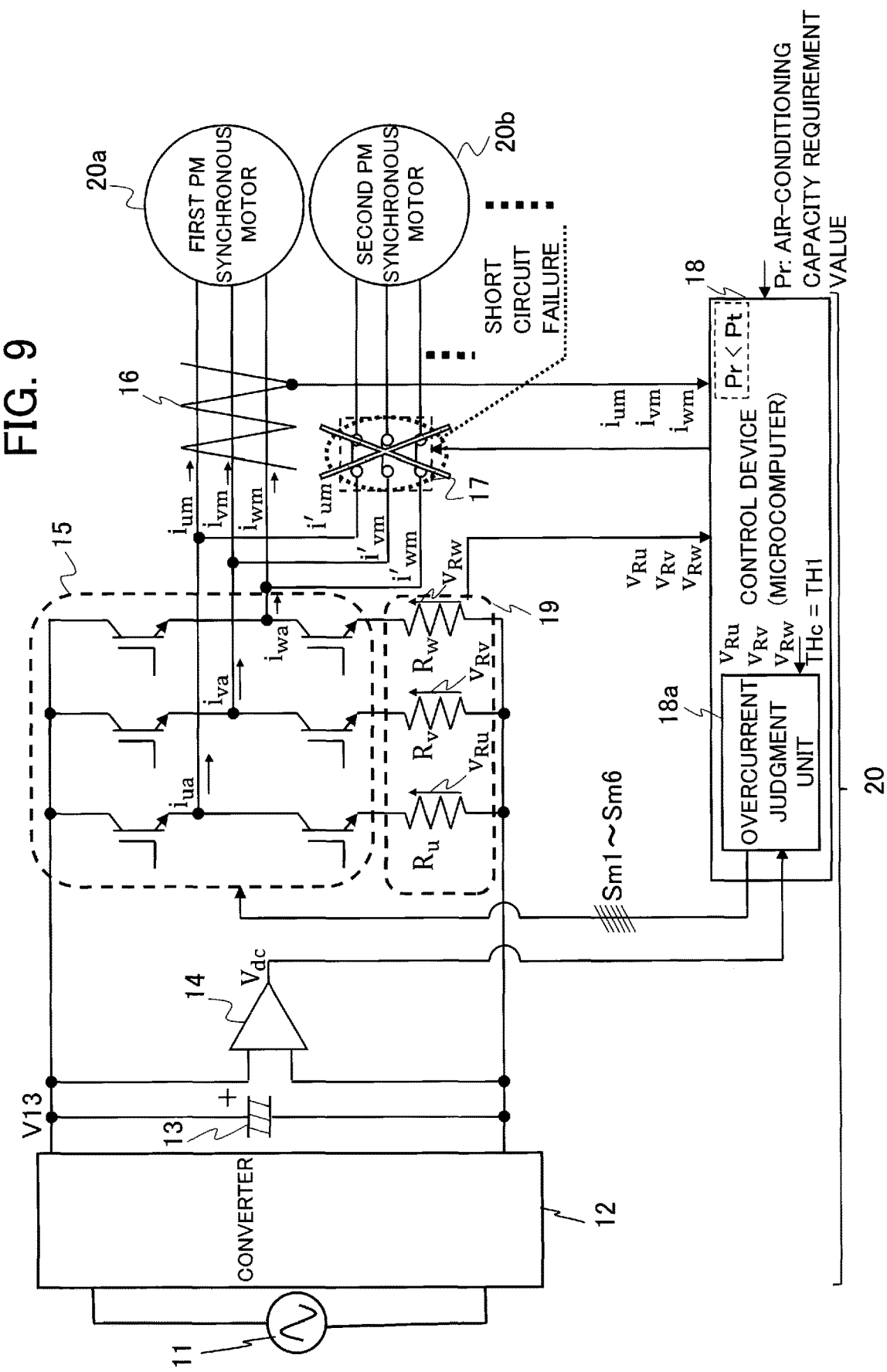
FIG. 9 is a diagram showing a state of a motor driving device according to a second embodiment (when a short circuit failure of a switch unit occurs).

FIG. 9 is a diagram showing a state of a motor driving device 20 according to a second embodiment (upon the occurrence of a short circuit failure of the switch unit 17).

Figure 10:
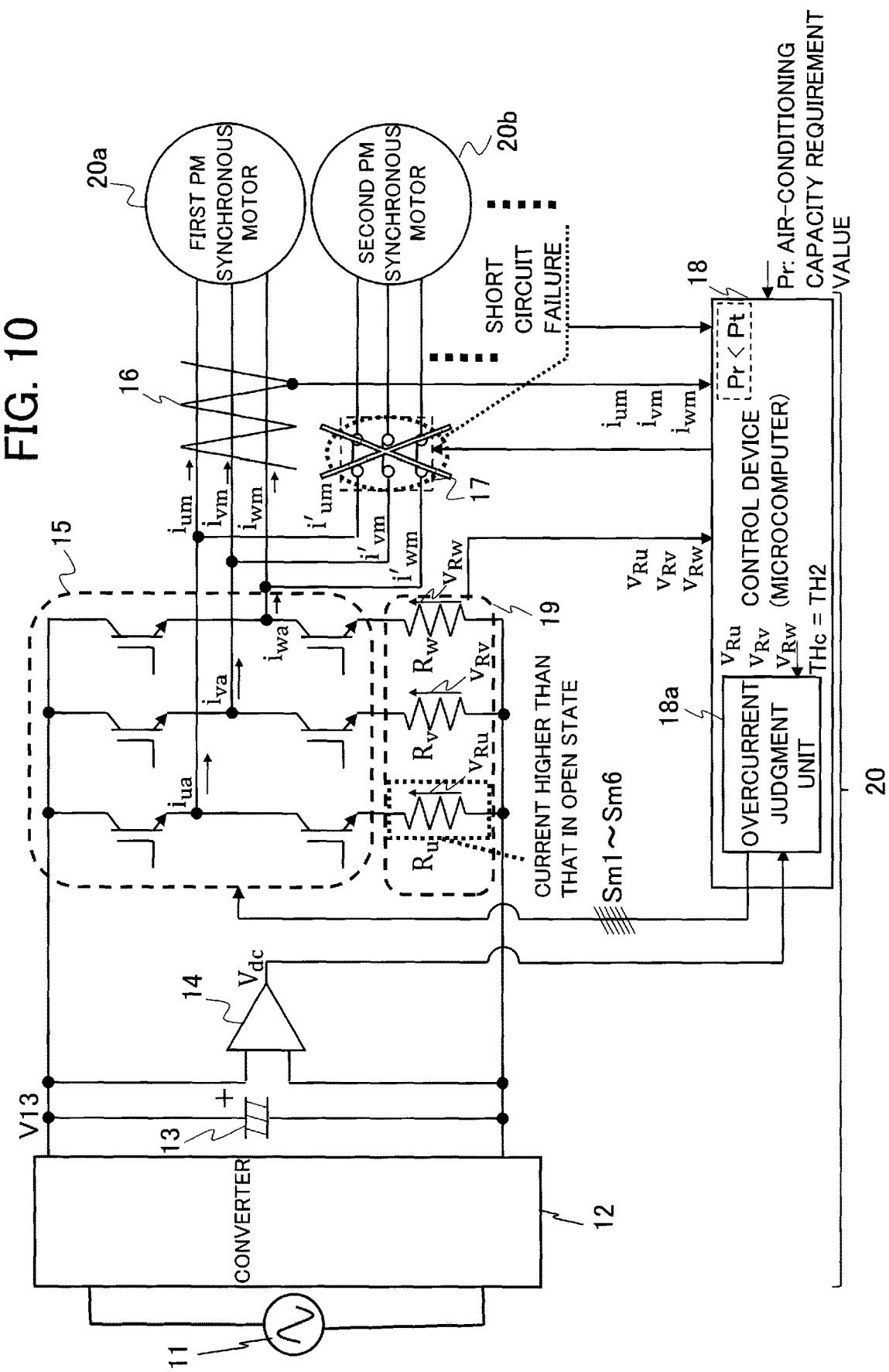
FIG. 10 is a diagram showing a state of the motor driving device according to the second embodiment (after changing an overcurrent interruption threshold value).

FIG. 10 is a diagram showing a state of the motor driving device 20 according to the second embodiment (after changing the overcurrent interruption threshold value THc from TH1 to TH2). In FIG. 9 and FIG. 10, each component identical or corresponding to a component shown in FIG. 1 and FIG. 2 is assigned the same reference character as in FIG. 1 and FIG. 2.

The motor driving device 20 according to the second embodiment differs from the motor driving device 10 according to the first embodiment in that a life-prolonging operation is made possible by appropriately setting the overcurrent interruption threshold value THc upon the occurrence of a short circuit failure of the switch unit 17 in which contact points of the switch unit 17 are in the closed state and the switch unit 17 is incapable of performing the on-off operation. The short circuit failure can occur due to fusion of contact points of the switch unit 17, for example. Except for this difference, the second embodiment is the same as the first embodiment. The following description will be given of a case where relays constituting the switch unit 17 are equipped with a failure notification means that notifies the control device 18 of the occurrence of the short circuit failure. However, the method for the control device 18 to detect the failure is not particularly limited.

FIG. 9 shows a state of the motor driving device 20 upon the occurrence of the short circuit failure of the switch unit 17 when the air-conditioning capacity requirement value Pr is less than the air-conditioning capacity threshold value Pt (i.e., when Pr<Pt). When Pr<Pt, the control device 18 has set the overcurrent interruption threshold value THc at the first overcurrent interruption threshold value TH1 that sets the protective current level (first protective current level) at a current value that is 90% of the irreversible demagnetization current value Id of the first PM synchronous motor 20a (shown in the step S3 in FIG. 6), for example. Namely, the control device 18 has set the overcurrent interruption threshold value THc at the first overcurrent interruption threshold value TH1 for times of operating one PM synchronous motor.

However, when the short circuit failure of the switch unit 17 occurs, both of the first PM synchronous motor 20a and the second PM synchronous motor 20b remain connected to the inverter 15 irrespective of a command signal from the control device 18. In this case, a current at a value corresponding the sum total of the current supplied to the first PM synchronous motor 20a and the current supplied to the second PM synchronous motor 20b flows through the inverter current detector 19. Thus, a current value represented by a detection value of the inverter current detector 19 is greater than or equal to the first overcurrent interruption threshold value TH1 and there is a danger that the operation of the air conditioner is stopped by the control device 18 by making the inverter 15 stop the supply of the AC current to the first and second PM synchronous motors 20a and 20b.

In order to avoid the occurrence of such a situation, in the motor driving device 20 according to the second embodiment, the control device 18 detects the short circuit failure of the switch unit 17 as shown in FIG. 10, and when the overcurrent judgment unit 18a of the control device 18 judges that a current higher than or equal to the first overcurrent interruption threshold value TH1 is flowing through the inverter current detector 19, the control device 18 compares the current value detected by the inverter current detector 19 with the current value of the motor current acquired from the first PM synchronous motor 20a and detected by the motor current detector 16. The control device 18 judges whether or not there is a difference greater than or equal to a predetermined value (e.g., twice) between the current value detected by the inverter current detector 19 and the current value acquired from the first PM synchronous motor 20a and detected by the motor current detector 16. When there is a difference greater than or equal to the predetermined value (e.g., twice), the control device 18 judges that the short circuit failure has occurred and changes the overcurrent interruption threshold value THc to the second overcurrent interruption threshold value TH2 for two PM synchronous motors (shown in the step S6 in FIG. 6). Accordingly, even in a period after the occurrence of the short circuit failure of the switch unit 17 till the elimination of the short circuit failure by repair, it is possible to drive two PM synchronous motors 20a and 20b, that is, to perform the life-prolonging operation.

As described above, with the motor driving device 20 and the air conditioner according to the second embodiment, in the air conditioner in which a plurality of PM synchronous motors are driven by one inverter 15, it is possible to switch the number of PM synchronous motors driven by the inverter 15 and prevent the occurrence of the irreversible demagnetization to the PM synchronous motors by changing the overcurrent interruption threshold value THc depending on the air-conditioning capacity requirement value Pr.

Further, with the motor driving device 20 and the air conditioner according to the second embodiment, even when the short circuit failure of the switch unit 17 has occurred, the life-prolonging operation can be performed with no irreversible demagnetization by changing the overcurrent interruption threshold value THc to the second overcurrent interruption threshold value TH2.

(3) Third Embodiment

Figure 11:
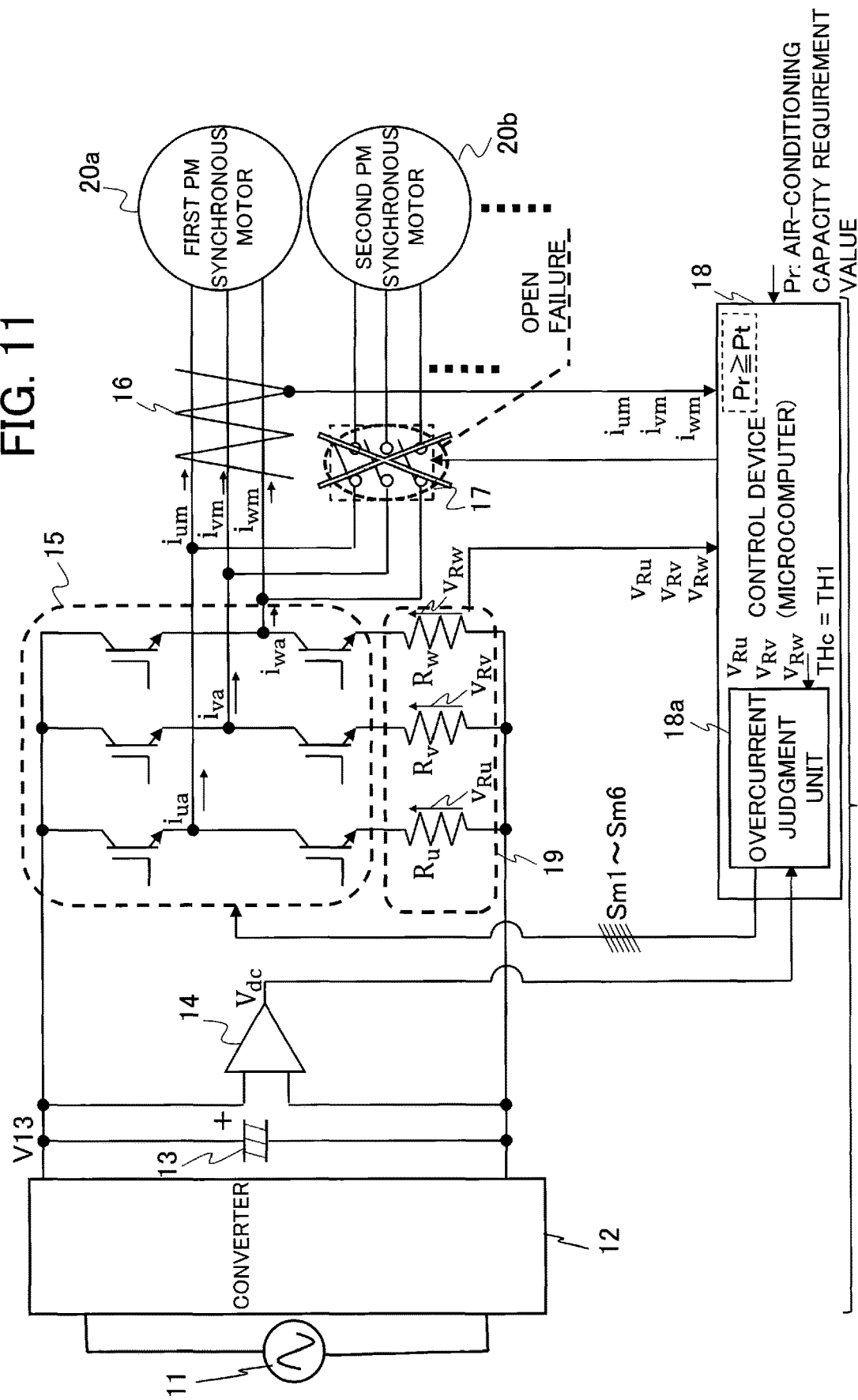
FIG. 11 is a diagram showing a state of a motor driving device according to a third embodiment (when an open failure of the switch unit occurs).
Figure 12:
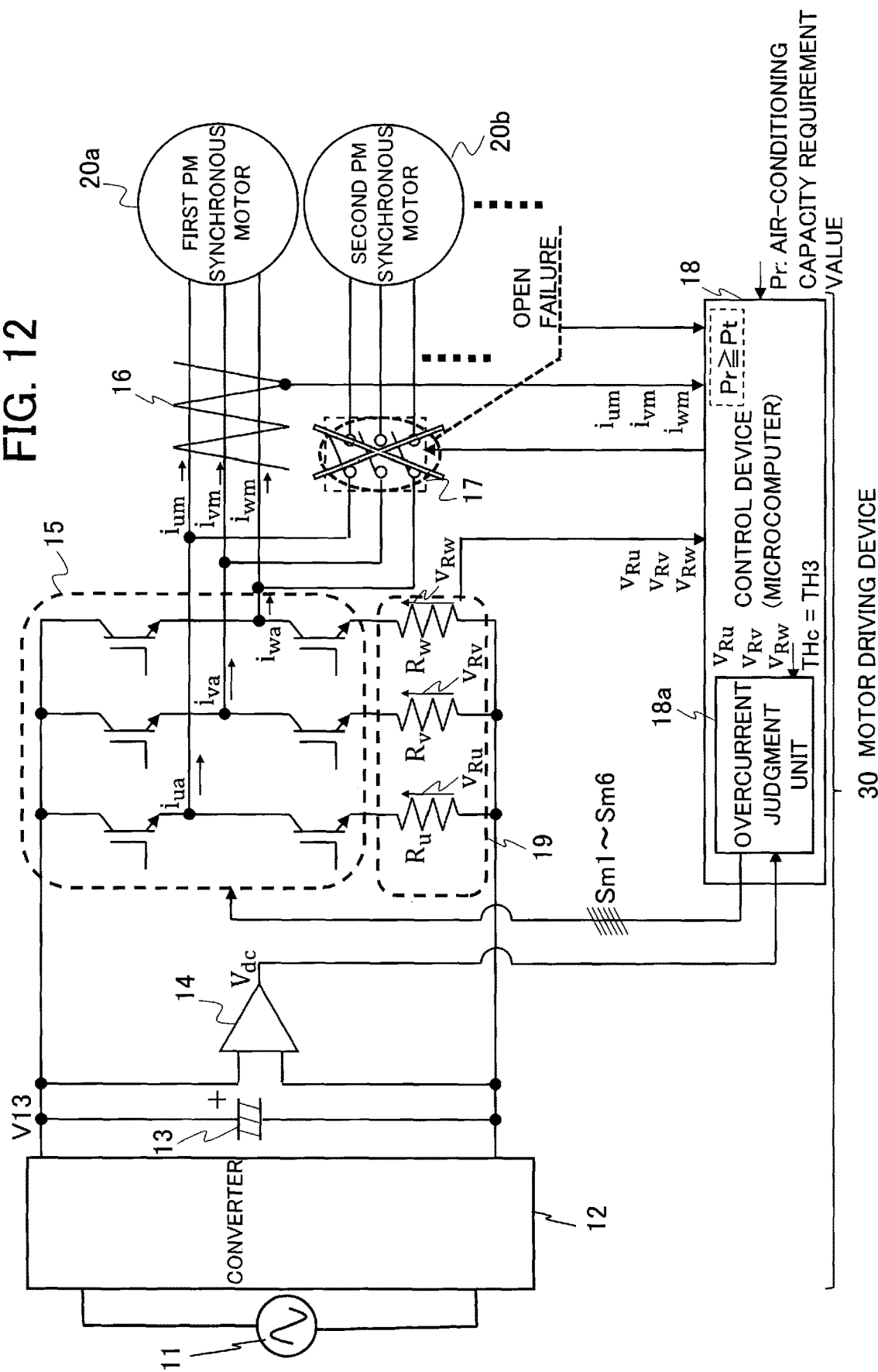
FIG. 12 is a diagram showing a state of the motor driving device according to the third embodiment (after changing an overcurrent interruption threshold value).

FIG. 11 is a diagram showing a state of a motor driving device 30 according to a third embodiment (when an open failure of the switch unit 17 occurs). FIG. 12 is a diagram showing a state of the motor driving device 30 according to the third embodiment (after changing the overcurrent interruption threshold value THc from TH1 to TH3). In FIG. 11 and FIG. 12, each component identical or corresponding to a component shown in FIG. 1 and FIG. 2 is assigned the same reference character as in FIG. 1 and FIG. 2.

The motor driving device 30 according to the third embodiment differs from the motor driving device 10 according to the first embodiment in that the life-prolonging operation is made possible by appropriately setting the overcurrent interruption threshold value THc upon the occurrence of an open failure of the switch unit 17 in which the contact points of the switch unit 17 are in the open state and do not perform the on-off operation. Except for this difference, the third embodiment is the same as the first embodiment. Further, the functions of the third embodiment may be applied to the device in the second embodiment. The following description will be given of a case where the relays constituting the switch unit 17 are equipped with a failure notification means that notifies the control device 18 of the occurrence of the open failure. However, the method for the control device 18 to detect the failure is not particularly limited.

FIG. 11 shows a state of the motor driving device 30 upon the occurrence of the open failure of the switch unit 17 when the air-conditioning capacity requirement value Pr is greater than or equal to the air-conditioning capacity threshold value Pt (i.e., when Pr Pt). When Pr Pt, the control device 18 has set the overcurrent interruption threshold value THc at the second overcurrent interruption threshold value TH2 (shown in the step S5 in FIG. 6) that sets the protective current level (second protective current level) at a current value taking into consideration the electric current phases of the first PM synchronous motor 20a and the second PM synchronous motor 20b.

However, when the open failure of the switch unit 17 occurs, only the first PM synchronous motor 20a is connected to the inverter 15 irrespective of the command signal from the control device 18. In this case, the air-conditioning capacity represented by the air-conditioning capacity requirement value Pr cannot be delivered since only the first PM synchronous motor 20a is operating. Even though the control device 18 further accelerates the rotation of the first PM synchronous motor 20a in order to deliver the air-conditioning capacity represented by the air-conditioning capacity requirement value Pr, the supplied AC current increases and can exceed the irreversible demagnetization current value Id of the first PM synchronous motor 20a.

In order to avoid the occurrence of such a situation, in the motor driving device 30 according to the third embodiment, when the control device 18 detects the open failure of the switch unit 17 as shown in FIG. 12, the control device 18 compares the current value of the current detected by the inverter current detector 19 with the current value of each motor current $i_{um}$, $i_{vm}$, $i_{wm}$ acquired from the first PM synchronous motor 20a and detected by the motor current detector 16. When the difference between the current value detected by the inverter current detector 19 and the current value acquired from the first PM synchronous motor 20a and detected by the motor current detector 16 is within a predetermined value (e.g., when the difference between the current values is within 10%), the control device 18 judges that the open failure has occurred and changes the overcurrent interruption threshold value THc to the first overcurrent interruption threshold value TH1 for one PM synchronous motor (shown in the step S3 in FIG. 6). Accordingly, even in a period after the occurrence of the open failure of the switch unit 17 till the elimination of the open failure by repair, it is possible to drive a PM synchronous motor, that is, to perform the life-prolonging operation.

Next, a description will be given of a change in the irreversible demagnetization current value Id depending on the air-conditioning capacity requirement value Pr. A PM synchronous motor includes a permanent magnet in the rotor. Demagnetization resistance varies depending on temperature characteristics of the permanent magnet. A rare-earth magnet, containing a rare-earth element such as neodymium as a material of the permanent magnet, becomes more likely to undergo the irreversible demagnetization, i.e., the irreversible demagnetization current value Id decreases, with the increase in the temperature. When the motor driving device according to the third embodiment is employed for an outdoor unit of an air conditioner, in the cooling operation, there is the possibility that the outdoor unit rises to a high temperature and the demagnetization resistance lowers further. Furthermore, in the vicinity of a heat source such as a compressor, there is the possibility that the PM synchronous motor rises to a higher temperature and the demagnetization resistance lowers. Therefore, it is possible to determine an appropriate overcurrent interruption set value by calculating the irreversible demagnetization current value Id from temperature data adapted to the air-conditioning capacity requirement value Pr of the air conditioner. Especially in cases of the open failure shown in FIG. 12, an air-conditioning operation compensating for the deficiency in the capacity becomes possible by setting the overcurrent interruption threshold value THc at a third overcurrent interruption threshold value TH3 corresponding to a value closer to the irreversible demagnetization current value Id in order to deliver the air-conditioning capacity represented by the air-conditioning capacity requirement value Pr by use of the first PM synchronous motor 20a alone. The third overcurrent interruption threshold value TH3 is a value corresponding to the first overcurrent interruption threshold value TH1 (=0.9× Id).

As described above, with the motor driving device 30 and the air conditioner according to the third embodiment, in the air conditioner in which a plurality of PM synchronous motors are driven by one inverter 15, it is possible to switch the number of PM synchronous motors driven by the inverter 15 and prevent the occurrence of the irreversible demagnetization to the PM synchronous motors by changing the overcurrent interruption threshold value THc depending on the air-conditioning capacity requirement value Pr.

Further, with the motor driving device 30 and the air conditioner according to the third embodiment, even when the open failure of the switch unit 17 has occurred, the life-prolonging operation can be performed with no irreversible demagnetization by changing the overcurrent interruption threshold value THc.

(4) Modification

Figure 13:
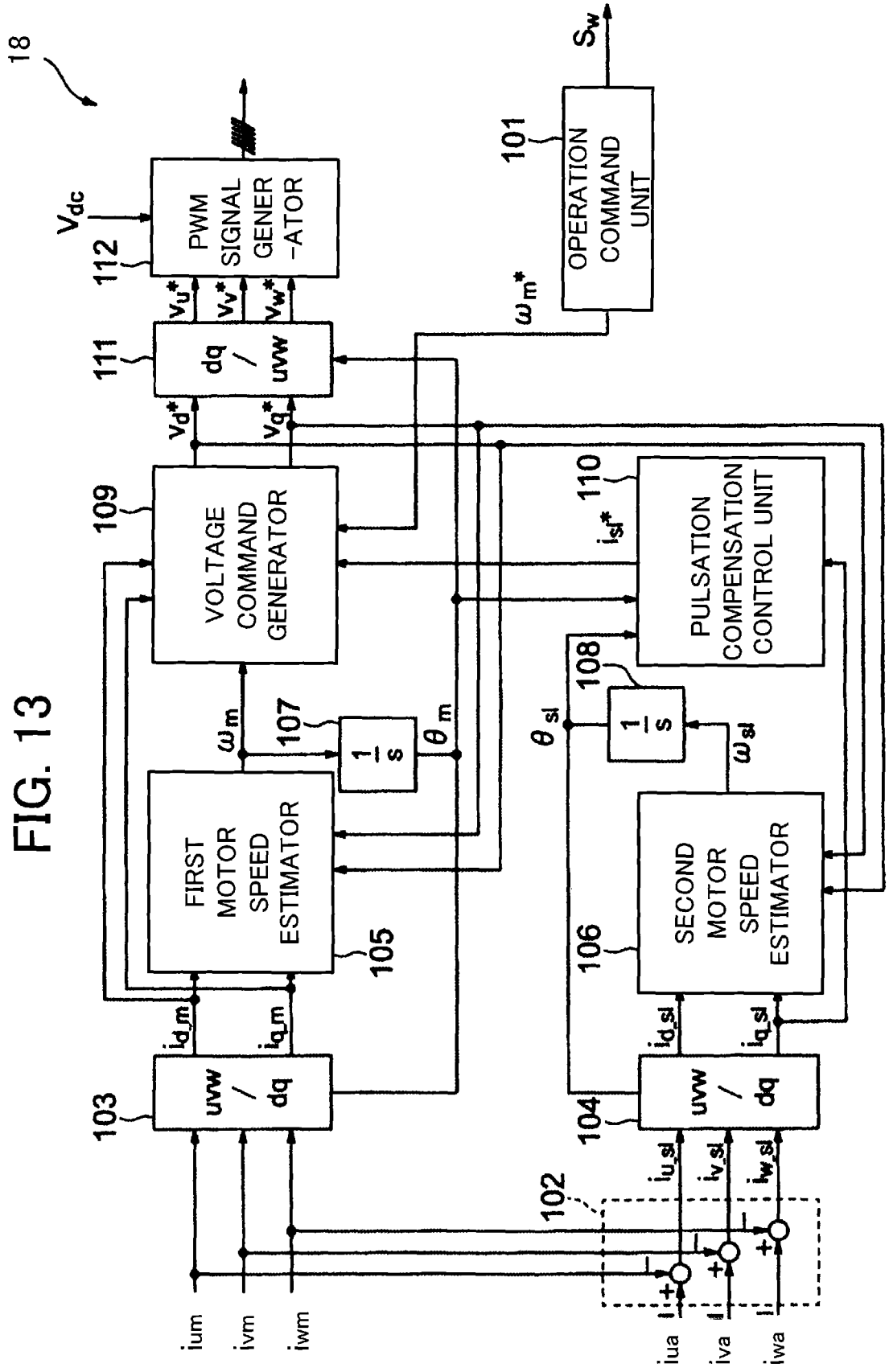
FIG. 13 is a functional block diagram showing a configuration example of a control device of the motor driving device in the first to third embodiments.

The control device 18 in the first to third embodiments can be configured as described below, for example. FIG. 13 is a functional block diagram showing a configuration example of the control device 18 in the first to third embodiments. As shown in the diagram, the control device 18 includes an operation command unit 101, a subtraction unit 102, coordinate transformers 103 and 104, first and second speed estimators 105 and 106, integrators 107 and 108, a voltage command generator 109, a pulsation compensation control unit 110, a coordinate transformer 111 and a PWM signal generator 112.

The operation command unit 101 generates and outputs a revolution speed command value $\omega_m^*$ for a motor. The operation command unit 101 also generates and outputs a switching control signal Sw for controlling a switch unit 17.

The subtraction unit 102 obtains currents (i.e., U-phase, V-phase and W-phase phase currents) $i_{u\_sl}$, $i_{v\_sl}$ and $i_{w\_sl}$ of the second PM synchronous motor 20b by subtracting the currents (i.e., U-phase, V-phase and W-phase phase currents) $i_{um}$, $i_{vm}$ and $i_{wm}$ of the first PM synchronous motor 20a from the currents (i.e., U-phase, V-phase and W-phase phase currents) $i_{ua}$, $i_{va}$ and $i_{wa}$ detected by the inverter current detector 19. This is calculation utilizing a relationship that the sum of the current $i_{um}$, $i_{vm}$, $i_{wm}$ of the first PM synchronous motor 20a and the phase current $i_{u\_sl}$, $i_{v\_sl}$, $i_{w\_sl}$ of the second PM synchronous motor 20b equals the phase current $i_{ua}$, $i_{va}$, $i_{wa}$ of the inverter.

The coordinate transformer 103 obtains dq-axis currents $i_{d\_m}$ and $i_{q\_m}$ of the first PM synchronous motor 20a by coordinate-transforming the phase currents $i_{um}$, $i_{vm}$ and $i_{wm}$ of the first PM synchronous motor 20a from a stationary three-phase coordinate system into a rotating two-phase coordinate system by using a phase estimate value (magnetic pole position estimate value) $\theta_m$ of the first PM synchronous motor 20a which will be described later.

The coordinate transformer 104 obtains dq-axis currents $i_{d\_sl}$ and $i_{q\_sl}$ of the second PM synchronous motor 20b by coordinate-transforming the phase currents $i_{u\_sl}$, $i_{v\_sl}$ and $i_{w\_sl}$ of the second PM synchronous motor 20b from the stationary three-phase coordinate system into the rotating two-phase coordinate system by using a phase estimate value (magnetic pole position estimate value) $\theta_{sl}$ of the second PM synchronous motor 20b which will be described later.

The first motor speed estimator 105 obtains a revolution speed estimate value $\omega_m$ of the first PM synchronous motor 20a based on the dq-axis currents $i_{d\_m}$ and $i_{q\_m}$ and dq-axis voltage command values $v_d^*$ and $v_q^*$ which will be described later. Similarly, the second motor speed estimator 106 obtains a revolution speed estimate value $\omega_{sl}$ of the second PM synchronous motor 20b based on the dq-axis currents $i_{d\_sl}$ and $i_{q\_sl}$ and the dq-axis voltage command values $v_d^*$ and $v_q^*$.

The integrator 107 obtains the phase estimate value $\theta_m$ of the first PM synchronous motor 20a by integrating the revolution speed estimate value $\omega_m$ of the first PM synchronous motor 20a. Similarly, the integrator 108 obtains the phase estimate value $\theta_{sl}$ of the second PM synchronous motor 20b by integrating the revolution speed estimate value $\omega_{sl}$ of the second PM synchronous motor 20b.

Incidentally, while the estimation of the revolution speed and the phase can be carried out by using a method described in Japanese Patent No. 4672236, for example, any method may be used as long as the revolution speed and the phase can be estimated. It is also possible to employ a method of directly detecting the revolution speed or the phase.

The voltage command generator 109 calculates the dq-axis voltage command values $v_d^*$ and $v_q^*$ based on the dq-axis currents $i_{d\_m}$ and $i_{q\_m}$ of the first PM synchronous motor 20a, the revolution speed estimate value $\omega_m$ of the first PM synchronous motor 20a, and a pulsation compensation current command value $i_{sl}^*$.

The coordinate transformer 111 obtains an applied voltage phase $\theta_v$ from the phase estimate value $\theta_m$ of the first PM synchronous motor 20a and the dq-axis voltage command values $v_d^*$ and $v_q^*$, and obtains voltage command values $v_u^*$, $v_v^*$ and $v_w^*$ in the stationary three-phase coordinate system by coordinate-transforming the dq-axis voltage command values $v_d^*$ and $v_q^*$ from the rotating two-phase coordinate system into the stationary three-phase coordinate system based on the applied voltage phase $\theta_v$.

The applied voltage phase $\theta_v$ is obtained by, for example, adding a leading phase angle $\theta_f$, which is obtained as $\theta_f = \tan^{-1}(v_q^*/v_d^*)$ from the dq-axis voltage command values $v_d^*$ and $v_q^*$, to the phase estimate value $\theta_m$ of the first PM synchronous motor 20a.

Figures 14A, 14B, 14C:
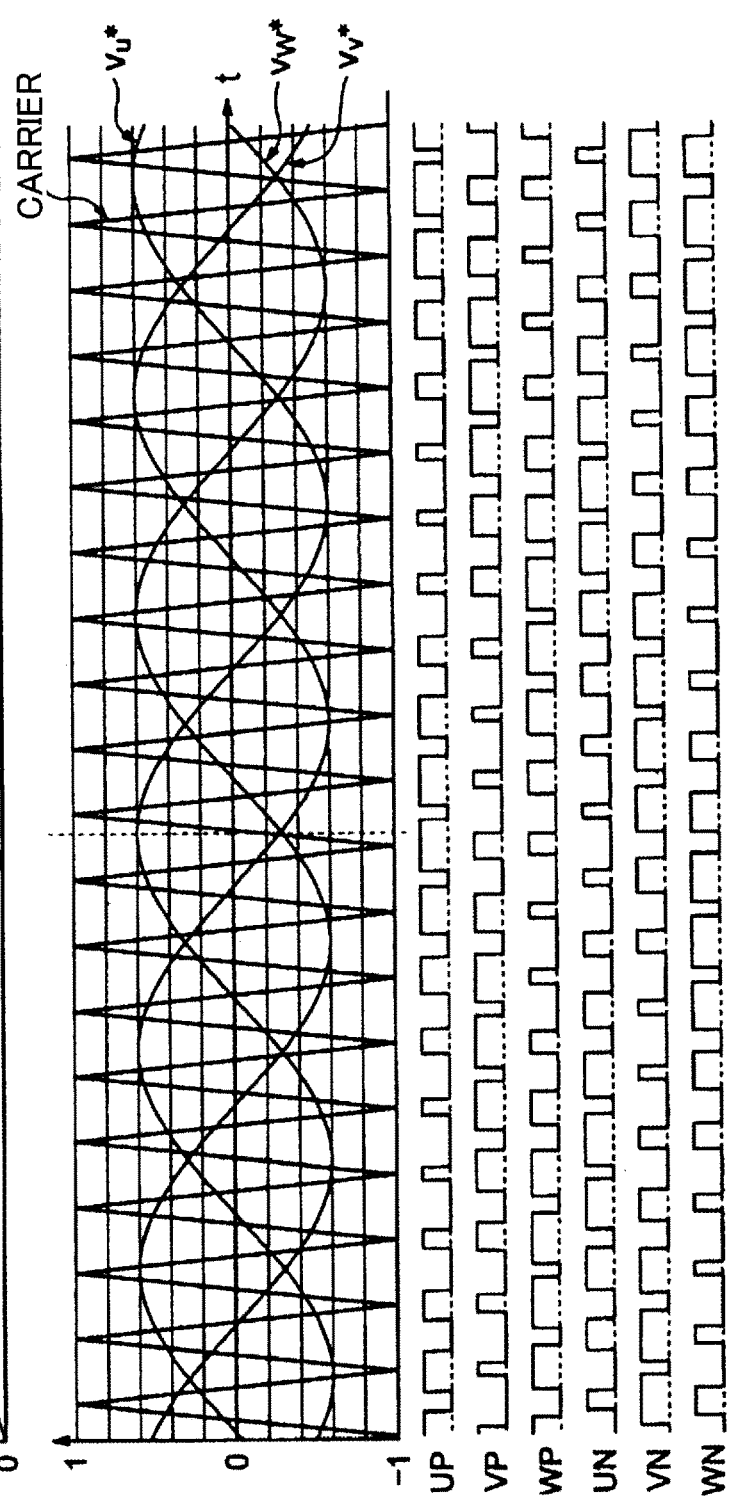
FIGS. 14(a) to 14(c) are diagrams showing the operation of a PWM signal generator in FIG. 13.

An example of the phase estimate value $\theta_m$, the leading phase angle $\theta_f$ and the applied voltage phase $\theta_v$ is shown in FIG. 14(a), and an example of the voltage command values $v_u^*$, $v_v^*$ and $v_w^*$ obtained by the coordinate transformer 111 is shown in FIG. 14(b).

The PWM signal generator 112 generates PWM signals UP, VP, WP, UN, VN and WN shown in FIG. 14(c) from the input voltage $V_{dc}$ and the voltage command values $v_u^*$, $v_v^*$ and $v_w^*$.

The PWM signals UP, VP, WP, UN, VN and WN are supplied to the inverter 15 and used for controlling the switching elements.

The inverter 15 is provided with a non-illustrated drive circuit that generates drive signals for driving the switching elements of the arms based on the corresponding PWM signals UP, VP, WP, UN, VN and WN.

By controlling the on-off switching of the switching elements of the inverter 15 according to the aforementioned PWM signals UP, VP, WP, UN, VN and WN, it is possible to make the inverter 15 output an AC voltage whose frequency and voltage value are variable and apply the AC voltage to the first PM synchronous motor 20a and the second PM synchronous motor 20b.

While the voltage command values $v_u^*$, $v_v^*$ and $v_w^*$ are sine waves in the example shown in FIG. 14(b), the voltage command values may also be waves having a third-order harmonic superimposed thereon; waves of any waveform may be used as long as the driving of the first PM synchronous motor 20a and the second PM synchronous motor 20b is possible.

If the voltage command generator 109 is configured to generate the voltage command based exclusively on the dq-axis currents $i_{d\_m}$ and $i_{q\_m}$ and the revolution speed estimate value $\omega_m$ of the first PM synchronous motor 20a, the first PM synchronous motor 20a is controlled appropriately, whereas the second PM synchronous motor 20b just operates according to the voltage command values generated for the first PM synchronous motor 20a and thus is in a state of not being directly controlled.

Therefore, the first PM synchronous motor 20a and the second PM synchronous motor 20b operate in a state with errors in the phase estimate value $\theta_m$ and the phase estimate value $\theta_{sl}$ and the errors become significant especially in a low speed range. Upon the occurrence of the errors, current pulsation of the second PM synchronous motor 20b occurs and there is a danger of the step-out of the second PM synchronous motor 20b and an increase in the loss due to heating by overcurrent. Further, there is a danger that circuit breaking is carried out in response to the overcurrent, the motor is stopped, and the driving of the load becomes impossible.

The pulsation compensation control unit 110, which is provided in order to resolve such problems, outputs the pulsation compensation current command value $i_{sl}^*$, for inhibiting the current pulsation of the second PM synchronous motor 20b, by using the q-axis current $i_{q\_sl}$ of the second PM synchronous motor 20b, the phase estimate value $\theta_m$ of the first PM synchronous motor 20a and the phase estimate value $\theta_{sl}$ of the second PM synchronous motor 20b.

The pulsation compensation current command value $i_{sl}^*$ is determined based on the result of a judgment on a phase relationship between the first PM synchronous motor 20a and the second PM synchronous motor 20b made from the phase estimate value $\theta_m$ of the first PM synchronous motor 20a and the phase estimate value $\theta_{sl}$ of the second PM synchronous motor 20b so as to inhibit pulsation of the q-axis current $i_{q\_sl}$ that corresponds to a torque current of the second PM synchronous motor 20b.

The voltage command generator 109 obtains a q-axis current command value $I_{q\_m}^*$ for the first PM synchronous motor 20a by performing a proportional-integral operation on the deviation between the revolution speed command value $\omega_m^*$ for the first PM synchronous motor 20a from the operation command unit 101 and the revolution speed estimate value $\omega_m$ of the first PM synchronous motor 20a.

On the other hand, the d-axis current of the first PM synchronous motor 20a is an excitation current component, and changing its value makes it possible to control the current phase and to drive the first PM synchronous motor 20a by flux-strengthening control or flux-weakening control. By using this property and incorporating the aforementioned pulsation compensation current command value $i_{sl}^*$ into a d-axis current command value $I_{d\_m}^*$ for the first PM synchronous motor 20a, it is possible to control the current phase and thereby reduce the pulsation.

The voltage command generator 109 obtains the dq-axis voltage command values $v_d^*$ and $v_q^*$ based on the dq-axis current command values $I_{d\_m}*$ and $I_{q\_m}*$ obtained as above and the dq-axis currents $i_{d\_m}$ and $i_{q\_m}$ obtained by the coordinate transformer 103. Namely, the d-axis voltage command value $v_d*$ is obtained by performing the proportional-integral operation on the deviation between the d-axis current command value $I_{d\_m}*$ and the d-axis current $I_{d\_m}$, and the q-axis voltage command value $v_q*$ is obtained by performing the proportional-integral operation on the deviation between the q-axis current command value $I_{q\_m}*$ and the q-axis current $I_{q\_m}$.

Incidentally, any configuration may be employed for the voltage command generator 109 and the pulsation compensation control unit 110 as long as the same functions can be implemented.

Performing the control described above makes it possible to drive the first PM synchronous motor 20a and the second PM synchronous motor 20b with one inverter 15 so that no pulsation occurs to the second PM synchronous motor 20b.

What is claimed is:

1. A motor driving device for driving at least one permanent magnet synchronous motor, comprising:
   an inverter to supply an alternating current;
   a switch to change a number of the at least one permanent magnet synchronous motor to which the alternating current is supplied from the inverter;
   a detector to detect a detection value corresponding to the alternating current supplied to the at least one permanent magnet synchronous motor; and
   circuitry to control the inverter and the switch, wherein
   the circuitry sets an overcurrent interruption threshold value at a value based on the number, and
   when the detection value is greater than or equal to the overcurrent interruption threshold value, the circuitry makes the inverter stop the supplying of the alternating current to the at least one permanent magnet synchronous motor.

2. The motor driving device according to claim 1, wherein when the number is one, the circuitry calculates a first protective current level by multiplying an irreversible demagnetization current value of the driven permanent magnet synchronous motor by a predetermined first ratio and sets a first overcurrent interruption threshold value as the overcurrent interruption threshold value so that the alternating current lower than the first protective current level is supplied.

3. The motor driving device according to claim 2, wherein the first ratio is 0.9.

4. The motor driving device according to claim 2, wherein when the number is two, the circuitry calculates a second protective current level by multiplying a current value at which each of the driven two permanent magnet synchronous motors outputs maximum torque by a second ratio and sets a second overcurrent interruption threshold value as the overcurrent interruption threshold value so that the alternating current lower than or equal to the second protective current level is supplied to the two permanent magnet synchronous motors.

5. The motor driving device according to claim 4, wherein the second ratio is 2.414.

6. The motor driving device according to claim 4, further comprising a motor current detector to detect a current value of motor current flowing into the driven permanent magnet synchronous motors, wherein
   when a short circuit failure is judged to have occurred in the switch, the circuitry compares a current value of the current supplied from the inverter with the detected value of the motor current when it is judged based on the detection value that current higher than or equal to a current value represented by the first overcurrent interruption threshold value is flowing through the detector, and
   in a case where there is a difference greater than or equal to a predetermined value between the current value of the current supplied from the inverter and the current value of the motor current, the circuitry changes the overcurrent interruption threshold value to the second overcurrent interruption threshold value.

7. The motor driving device according to claim 6, wherein the case where there is a difference greater than or equal to the predetermined value is a case where the current value of the current supplied from the inverter is twice or more of the current value of the motor current.

8. The motor driving device according to claim 4, wherein when an open failure is judged to have occurred in the switch, the circuitry sets a third overcurrent interruption threshold value greater than the first overcurrent interruption threshold value as the overcurrent interruption threshold value.

9. An air conditioner comprising:
   a plurality of permanent magnet synchronous motors; and
   a motor driving device to drive at least one permanent magnet synchronous motor among the plurality of permanent magnet synchronous motors, wherein
   the motor driving device includes:
   an inverter to supply an alternating current;
   a switch to change a number of the at least one permanent magnet synchronous motor to which the alternating current is supplied from the inverter;
   a detector to detect a detection value corresponding to the alternating current supplied to the at least one permanent magnet synchronous motor; and
   circuitry to control the inverter and the switch-unit, wherein
   the circuitry sets an overcurrent interruption threshold value at a value based on the number, and
   when the detection value is greater than or equal to the overcurrent interruption threshold value, the circuitry makes the inverter stop the supplying of the alternating current to the at least one permanent magnet synchronous motor.

10. The air conditioner according to claim 9, wherein the circuitry receives an air-conditioning capacity requirement value representing air-conditioning capacity required of the air conditioner and switches a connection state of the switch based on the air-conditioning capacity requirement value.

11. The air conditioner according to claim 10, wherein when the air-conditioning capacity requirement value is less than an air-conditioning capacity threshold value representing an upper limit of present air-conditioning capacity, the circuitry maintains the number unchanged by setting the connection state of the switch in an open state, and
   when the air-conditioning capacity requirement value is greater than or equal to the air-conditioning capacity threshold value, the control device increases the number by setting the connection state of the switch in a closed state.

12. The air conditioner according to claim 11, wherein the air-conditioning capacity requirement value is designated by a number of the permanent magnet synchronous motors that need to be driven, and
   the air-conditioning capacity threshold value is designated by a number of the permanent magnet synchronous motors presently driven.

13. Circuitry for controlling the motor driving device, the motor driving device comprising an inverter to supply an alternating current to at least one permanent magnet synchronous motor, a switch to change a number of the at least one permanent magnet synchronous motor to which the alternating current is supplied from the inverter; and a detector to detect a detection value corresponding to the alternating current supplied to the at least one permanent magnet synchronous motor, wherein the circuitry sets an overcurrent interruption threshold value at a value based on the number, and when the detection value is greater than or equal to the overcurrent interruption threshold value, the circuitry makes the inverter stop the supplying of the alternating current to the at least one permanent magnet synchronous motor.

14. A control method of a motor driving device for controlling the motor driving device, the motor driving device comprising an inverter to supply an alternating current to at least one permanent magnet synchronous motor, a switch to change a number of the at least one permanent magnet synchronous motor to which the alternating current is supplied from the inverter; and a detector to detect a detection value corresponding to the alternating current supplied to the at least one permanent magnet synchronous motor, wherein the control method comprising:

setting an overcurrent interruption threshold value at a value based on the number, and when the detection value is greater than or equal to the overcurrent interruption threshold value, making the inverter stop the supplying of the alternating current to the at least one permanent magnet synchronous motor.

* * * * *